United States Patent [19]
Castellanet et al.

[11] Patent Number: 4,982,106
[45] Date of Patent: Jan. 1, 1991

[54] DEVICE FOR DETECTING AT LEAST ONE VARIABLE RELATING TO THE MOVEMENT OF A MOVABLE BODY

[75] Inventors: Frédéric Castellanet, Angouleme; André Vergez, Saint Germain, both of France

[73] Assignee: La Telemacanique, France

[21] Appl. No.: 301,963

[22] Filed: Jan. 26, 1989

[30] Foreign Application Priority Data

Jan. 27, 1988 [FR] France ................. 88 00927

[51] Int. Cl.⁵ ............ G01D 5/00; F16H 53/00; H01H 15/00; H01H 21/00
[52] U.S. Cl. ................... 307/120; 307/116; 200/47; 340/670; 340/686; 33/707
[58] Field of Search .............. 307/112, 116, 118, 119, 307/120, 129; 200/47; 324/173–175, 207, 208; 33/707, 708, 501.02, 501.03, 501.04; 340/669, 670, 686; 250/231 R, 231 SE

[56] References Cited
U.S. PATENT DOCUMENTS 3,956,973 5/1976 Pomplas ................. 92/5 R
4,797,564 1/1989 Ramunas ................. 307/119

FOREIGN PATENT DOCUMENTS 1925158 11/1970 Fed. Rep. of Germany.
906990 9/1962 United Kingdom.

OTHER PUBLICATIONS

Machine Design, vol. 40, No. 26, Nov. 7, 1968, pp. 185–189, R. J. Perle: "Reliable Limit-Switch Operation".
Patent Abstracts of Japan, vol. 5, No. 202 (P-95) [874], Dec. 22, 1981; & JP-A-56-124 015 (Hitachi Seisakusho K.K.), 29/09/81.

Primary Examiner—A. D. Pellinen
Assistant Examiner—David Osborn
Attorney, Agent, or Firm—Kenyon & Kenyon

[57] ABSTRACT

A lever (6) is pushed by a cam profile (23) formed on an actuating member (9) fastened to a movable body (12), the movement of which is to be detected. A cam (13) fixed to the lever moves a plunger (16) which actuates a position switch (33). There is interposed between the plunger and the switch an influencing member (22), the position of which is measured by means of a card (28) passing in front of photoelectric detectors (29). A processing unit (31) supplies, at the output, an analog or numerical signal relating to the position of the movable body (12), to its speed or to its acceleration.

26 Claims, 2 Drawing Sheets

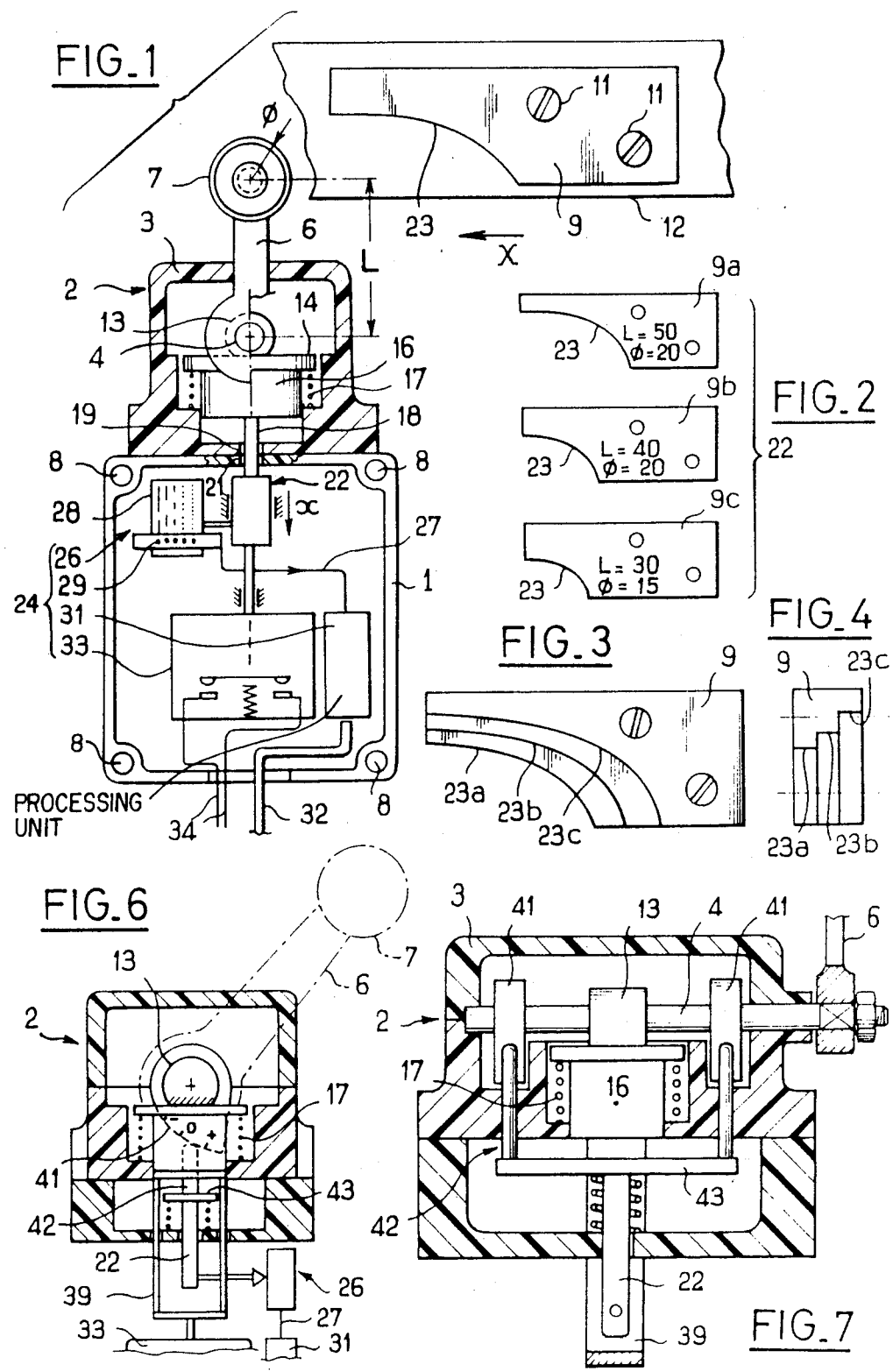

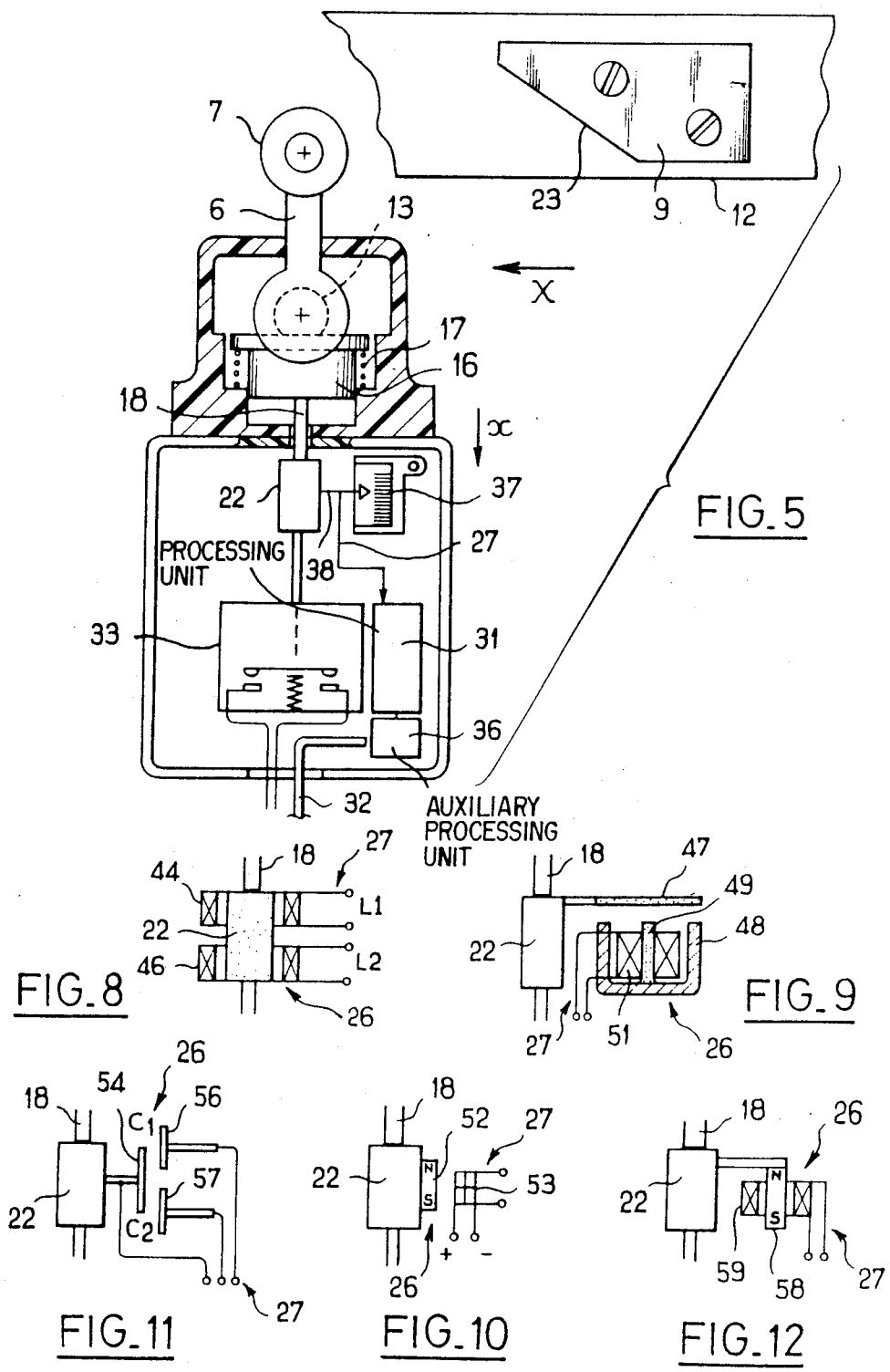

DEVICE FOR DETECTING AT LEAST ONE VARIABLE RELATING TO THE MOVEMENT OF A MOVABLE BODY

BACKGROUND OF THE INVENTION

1. Technical Field

The present invention relates to a device for detecting at least one variable relating to the movement of a movable body, especially in a machine or an installation.

Such a device can be useful, for example, for the purpose of regulating a motive force or a braking force or a time limit to be provided for the braking of the movable body, etc.

The variable to be detected can be the instantaneous position of the movable body, its speed or its acceleration. Because of the diversity of these variables, the possible nature of the movable body and the atmospheres in which it may be located, it is a necessary precondition to provide several types of instrument.

2. Related Art

Certainly, there are known devices, called "position switches" or "limit switches", which comprise a movement sensor intended, at rest, to be located in the path of the movable body or of an actuating member fastened to the movable body. When the sensor is actuated by the movable body, it in turn actuates a control tappet of a switch.

This type of switch allows only relatively crude synchronised controls.

SUMMARY OF THE INVENTION

The invention is based on the idea of providing an instrument which is similar to this type of known switches, but in which a movement variable of an internal member moved by the sensor would be measured, in order to deduce from this a measurement of the movement variable of the movable body, with a knowledge of the law of transmission of movement between the movable body and this member.

The object of the invention is to put this inventive idea into practice.

The invention is thus aimed at a device for detecting at least one variable relating to the movement of a movable body, especially in a machine or installation, comprising a movement sensor intended, at rest, to be located in the path of the movable body or of an actuating member fastened to the movable body, the movement sensor being capable of converting the movement of the movable body into a corresponding movement of an influencing member, and detection means providing an output signal as a function of the movements of the influencing member.

According to the invention, the device is characterized in that the detection means is designed to prepare, at least over a predetermined stroke of the influencing member, an electrical signal, the value of which belongs to the group including a substantially monotonic function of the position of the influencing member and a function of the speed of the influencing member, and so that the output signal of the detection means belongs to the group including a substantially monotonic function of the position of the movable body, a function of the speed of the movable body and a function of the acceleration of the movable body.

Thus, instead of seeking to measure directly the value of such and such a variable relating to the movement of the movable body, the movement of the movable body is converted into a movement of the influencing member and the detection means analyze the movement of the influencing member.

It is thus possible to produce an inexpensive instrument standardised for many uses, because, whatever the movable body may be, the influencing member can always be the same, and consequently its movement can always be analysed in the same way. This also contributes to reliability, the more so because the detection means can operate in a protected atmosphere.

According to an advantageous embodiment of the invention, the detector also possesses a switch actuated by the influencing member and/or by the movement sensor, this switch supplying a second output signal from the detector.

Thus, the detector supplies both a binary signal indicating the passage of the movable body into a specific position and, for example, a signal relating to the speed of the movable body during this passage.

Further particular features and advantages of the invention will also emerge from the following description.

BRIEF DESCRIPTION OF THE DRAWINGS

In the accompanying drawings given way of nonlimiting example:

FIG. 1 is a partially sectional elevation view of a device according to the invention, FIG. 2 is an elevation view of a set of interchangeable actuating members;

FIG. 3 is an elevation view of an actuating member having three cam profiles which can be used according to choice;

FIG. 4 is a front view of the actuating member of FIG. 3;

FIG. 5 is a view similar to that of FIG. 1, but relating to another embodiment;

FIG. 6 is a view similar to that of FIG. 1, but partial, of a third embodiment of the invention;

FIG. 7 is a sectional view of the embodiment of FIG. 6 taken in the plane of the axes of the lever and plunger; and FIGS. 8 to 12 are diagrammatic views of five other embodiments of the means for analysing the movement of the influencing member.

DETAILED DESCRIPTION OF THE PREFERRED EMBODIMENTS

In the example illustrated in FIG. 1, the device according to the invention comprises a housing 1 which is closed during operation by means of a cover (not shown) and to one face of which is fastened a mechanical sensor 2 or movement sensor. This produces an assembly which, seen from outside, has substantially the appearance and dimensions of a conventional limit switch and which can therefore be mounted on a support designed for limit switches.

The sensor 2 comprises a body 3, in which is mounted rotatably a shaft 4, of which one end projecting laterally from the body 3 (see FIG. 7 in this respect) is fixed to a lever 6, the free end of which carries a roller 7 (FIG. 1) with an axis parallel to the shaft 4.

The housing 1 has fastening holes 8 making it possible to fasten the device in a position in which the roller 7 is located in the path of an actuating member 9 fastened, by means of two screws 11, to a movable body 12, the movement of which is to be measured.

Inside the body 3, the shaft 4 is fixed to a cam 13. The body 3 also contains a plunger 16 and a compression spring 17 which surrounds the plunger 16 and which presses an end face 14 of the latter against the active profile of the cam 13.

In the position shown, in which no external action is exerted on the roller 7, the plunger 16 stressed by the spring 17 has returned the cam 13 into the position of maximum relaxation of the spring 17, which, where the lever 6 is concerned, corresponds to a position of rest, in which it is raised perpendicularly relative to the direction of movement X of the movable body 12.

So that the position of rest of the lever 6 is clearly defined, that region of the cam 13 which is then pressed against the face 14 of the plunger 16 is formed by a flat. The active profile of the cam 13 is symmetrical relative to a plane passing through the axis of rotation of the cam and perpendicular relative to the flat, so that the movement of the plunger 16 is the same, whatever the direction in which the lever 6 is inclined from its position of rest shown.

Remote from the cam 13, the plunger 16 is fixed to a central tappet 18 which, via a central hole 19 in the body 3 and a central hole 21 in the housing 1, penetrates into the latter. The body 3 can be fastened to the housing 1 in several different orientations about the axis of the tappet 18, thus making it possible, in a given orientation of the housing 1, to make the device capable of reacting to differently oriented movements X.

The tappet 18 bears on an influencing member 22 mounted slidably in the housing 1 in a direction parallel to the sliding direction of the plunger 16, itself perpendicular to the direction of movement X of the movable body 12.

Thus, when the movable body 12 continues its movement X and the actuating member 9 meets the roller 7, the lever 6 is inclined and the cam 13 pushes the plunger 16 which in turn pushes the influencing member 22 in a movement x.

The cam 13 has a profile such that the ratio between the angular speed of the lever 6 and the speed of the movement x depends on the angular position of the lever 6. On the actuating member 9, a cam profile 23 is provided, which is such that the ratio between the speed of the movable body 12 and the angular speed of the lever 6 is inversely proportional to the ratio between the angular speed of the lever 6 and the speed of movement x. Thus, the ratio between the speed of the movable body 12 and that of the influencing member 22 is independent of the inclination of the lever 6, provided, of course, that the roller 7 is pressed against the cam profile 23.

The device possesses furthermore, detection means 24 which comprises means 26 for supplying at the output, on a line 27, a signal which is substantially a monotonic function of the position of the influencing member 22 along its path x. As is known, a monotonic function is a function, the value of which varies in the same direction for any variation of the variable in the same direction. Thus, the means 26 supplies a signal making it possible to distinguish the position of the influencing member from any other position which it could occupy, at least over a predetermined effective stroke. A particular object of this is to distinguish the means 26 from means of the switch type which would supply a signal changing from one level to another once only over the predetermined stroke of the influencing member. In contrast, the intention, in specifying that the signal is a "substantially" monotonic function, is to include the signals which would be identical for two positions only very slightly different from one another.

In the example shown, the means 26 comprises a punched card or the like 28 fastened to the influencing member 22 and passing in front of photosensitive members 29. In a known manner, the combination of the readings made by each of the photosensitive members 29 is a numerical indication of the position of the card 28 and consequently of that of the influencing member 22.

The reading taken in this way is sent to a processing unit 31 via the line 27. The processing unit 31 converts the signal received on the line 27 into an output signal which, in the example illustrated, it supplies by means of a fibre-optical light guide 32.

The processing unit 31 converts the signal received on the line 27 into a signal which can be used on the outside. It can also carry out on this signal operations, such as derivation or integration, for example derivation if a signal relating to the speed of movement of the movable body 12 is to be obtained by the line 32. The processing electronics 31 can also possess filtering means, especially in order to eliminate spurious measurements resulting, for example, from possible mechanical bounces.

If the acceleration of the movable body 12 is to be determined, the processing unit 31 derives twice in succession the signal received on the line 27 and interpreted.

It may also be desirable if the line 32 simply supplies information relating to the position of the movable body 12. This may be useful when the movements in a machine or installation are to be synchronised.

The influencing member 22 also serves as transmission means between the tappet 18 and a switch 33 which likewise forms part of the detection means 24.

The two wires 34 of the switch 23, like the line 32, form an output of the device. The binary signal supplied by the conductors 34 and relating to the position of the movable body 12 can be used to carry out one or more conventional controls or to ensure safety if an anomaly affects the information supplied on the fibre-optical light guide 32 or the utilisation of this information.

The device just described functions as follows:

In its movement represented by the arrow X, the actuating member 9 fastened to the movable body 12 meets the roller 7 by means of its cam profile 23 and causes the lever 6 to pivot to the left of the figure. The cam 13, driven in rotation by the lever 6, moves the plunger 16 towards the housing 1 by virtue of the compression of the spring 17. This causes the sliding of the influencing member 22. The rows of perforations in the card 28 fastened to the member 22 pass in front of the detectors 29, of which the pulses supplied on the line 27 are counted in the unit 31 which deduces from them a measurement of the position of the member 22 at any moment. Because of the constancy of the speed ratio between the member 22 and the movable body 12 in terms of absolute value, the position, speed and acceleration measurements which are made on the influencing member 22 or according to its movements also constitute respectively measurements of the position, speed and acceleration of the movable body 12 when the roller 7 is pressed against the profile 23.

It should be noted that, because of the symmetry of the cam 13, the speed ratio between the movable body 12 and the member 22 has a sign which is a function of the direction of movement X. The measurement supplied is therefore an absolute-value measurement in terms of speed and acceleration and an absolute-value measurement of the movement from the position of rest of the lever, in terms of the position measurement.

Moreover, the lines 34 give an indication that the movable body 12 has passed a predetermined particular position when the switch 33 changes its state.

Depending on the particular uses, it may be desirable to analyse the movement of the movable body 12 over a shorter or longer path. This is possible by changing the length of the lever 6. The device can, for example, possess three levers 6 of respective lengths 30, 40 and 50 mm, which can be mounted, according to choice, at the end of the shaft 4. The shortest lever of length L=30 mm can carry a roller 7 of reduced diameter, for example 15 mm instead of 20.

In this case, the device also possesses three actuating members 9a, 9b and 9c (FIG. 2), each being designed to interact with one of the three levers mentioned above. In particular, the cam profiles 23 of the three actuating members 9a, 9b and 9c are different, so that, whatever the lever used, the transmission ratio between the movable body 12 and the influencing member 22 is constant, irrespective of the angular position of the lever used.

Depending on which lever is fastened to the shaft 4, the corresponding actuating member 9a, 9b or 9c is fastened to the movable body 12.

In the example illustrated in FIGS. 3 and 4, a single actuating member 9 has three stepped cam profiles 23a, 23b and 23c, each designed to interact with one of the levers which can be fastened to the end of the shaft 4. By selectively shifting the housing 1 relative to the movable body 12 in the direction parallel to the shaft 4, the roller 7 is made to interact selectively with the corresponding cam profile 23a, 23b or 23c.

The example of FIG. 5 will be described only with regard to its differences from that of FIG. 1.

The cam profile 23 of the actuating member 9 consists of a plane oblique relative to the direction of movement X of the movable body 12.

Thus, there is no need to ensure that the roller 7 meets the cam profile 23 at an exact point to ensure that a specific transmission ratio is obtained for each angular position of the lever 6. On the contrary, whatever the position of the housing 1 in the direction parallel to the lever 6, the law of conversion of movement between the movable body 12 and the lever 6 will be the same, as long as the roller 7 is pressed against the cam profile 23.

In contrast, the ratio between the angular speed of the lever 6 and the linear speed of the movable body 12 is no longer inversely proportional to the ratio between the angular speed of the lever 6 and the linear speed of the influencing member 22. The ratio between the speed of the influencing member 22 and the speed of the movable body 12 therefore depends on the position of the influencing member 22. Nevertheless, the variations of this ratio are known. To compensate for them, the processing unit 31 supplies its output signal to an auxiliary processing unit 36 which multiplies the output signal from the processing unit 31 by a factor inversely proportional to the ratio between the speed of the influencing member 22 and that of the movable body 12. The output signal sent on the fibre-optical light guide 32 is therefore a measurement of the position, speed or acceleration of the movable body 12, depending on the operations carried out by the processing unit 31.

FIG. 5 also shows, instead of the means with punched cards, a rheostat 37 which is fastened to the housing 1 and the slide 38 of which is carried by the influencing member 22. The outlet of the slide 38 is connected to the conductor 27 which thus supplies, at the input of the processing unit 31, a voltage which is a monotonic function of the position of the influencing member 22.

The example illustrated in FIG. 6 again includes the lever 6, the cam 13, the plunger 16 and the compression spring 17.

However, the plunger 16 is connected only to a transmission member 39 designed to actuate the switch 33.

On either side of the cam 13, the shaft 4 carries two identical cams 41 acting on the two ends of a U-shaped piece 42, the central part 43 of which is fixed to the influencing member 22. Thus, the member 22 moves coaxially with the plunger 16, but independently of this, because the cams 41 have a profile different from that of the cam 13. In particular, as shown in FIG. 6, the cams 41 have such a profile that the position of the member 22 is a monotonic function of the angular position of the lever 6 from one end of its angular stroke to the other. In other words, when the lever 6 is shifted in two different directions from its position of rest, the influencing member 22 moves in two different directions from a mid-position of its stroke. Thus, the processing electronics 31 are capable of providing an indication of the direction of movement of the movable body 12. However, the action on the switch 33 is maintained, whatever the direction of the movement of the movable body 12.

The cams 41 ensuring the movement of the influencing member 22 no longer have to ensure the positioning of the lever 6 at rest. Under these conditions, they can be given any desired profile in order to obtain a specific speed ratio between the angular speed of the lever 6 and the linear speed of the influencing member 22. This embodiment is therefore suitable for use with an actuating member 9, as illustrated in FIG. 5, without the need to provide the auxiliary unit, such as 36, present in FIG. 5.

FIGS. 8 to 12 illustrate different exemplary embodiments of means for generating an electrical signal representing a variable relating to the movement of the influencing member 22.

In the example of FIG. 8, the influencing member 22 is a soft-iron bar engaged in two successive coils 44 and 46. The processing unit determines the ratio between the inductances L1 and L2 of the two coils, this ratio varying as a function of the axial position of the bar 22 through the coils 44 and 46.

In the example of FIG. 9, the influencing member 22 carries a magnetic armature 47 which, as a function of the position of the member 22, closes to a greater or lesser extent a magnetic yoke 48, of which a core 49 is surrounded by a coil 51. In this example, the processing unit 31 (not shown) is sensitive to the inductance of the coil 51, the terminals of which are connected to the line 27 which in this case is bifilar.

In the example of FIG. 10, the influencing member 22 carries a permanent magnet 52 passing in front of a Hall-effect probe 53, the measuring terminals of which are connected to the bifilar line 27.

In the embodiment of FIG. 11, the influencing member 22 carries a capacitor armature 54 which moves parallel to itself in front of two fixed armatures 56 and 57. The line 27, which in this case is trifilar, is connected to the three armatures. The processing unit 31 evaluates, as an indication of the position of the influencing member 22, the ratio between the capacitancies $C_1$ and $C_2$ which the armature 54 forms respectively with the fixed armature 56 and with the fixed armature 57.

In the example of FIG. 12, the influencing member 22 carries a permanent magnet 58 which moves through a fixed coil 59, the terminals of which are connected to the bifilar line 27. The voltage at the terminals of the coil 59 is a function of the speed of movement of the permanent magnet 58 and consequently of the speed of the influencing member 22. In this case, therefore, a detection of the position of the member 22 is not involved. If it is intended that the line 32 should give indications of the position of the movable body 12, the processing unit 31 must be an integration unit.

Of course, other types of detectors are possible, for example high-frequency inductive position detectors, the damping and/or frequency of which can vary, resistive strain gauge, variable-frequency oscillator, deformed piezoelectric materials, etc.

The invention embrace possible embodiments in which the detecting means 26 detects in the all-or-nothing mode the crossing of an acceleration or speed threshold by the influencing member 22 and/or the embodiments which, on the line 32, supply a binary signal indicating that the movable body 12 has exceeded or not exceeded a speed or acceleration threshold.

If the movable body 12 is capable of moving in both directions, the actuating member can have two opposing cam profiles, each operational in one of the directions of movement.

Any one of the mechanical structures described can be combined, as desired, with any one of the means considered for analysing the movement of the influencing member 22.

The movement sensor can be of various types. It can, for example, be of the type with an element tilting from one position to another during the passage of the movable body. The element of such a sensor is, for example, a tilting fork, into which a stud carried by the movable body engages. The stud drives the fork which tilts, after which the stud leaves the fork and continues its travel, leaving the fork in a changed position. The sensor can also be of the type with a sliding tappet which, as a result of the passage of the movable body, is subjected to stress causing it to be depressed. The movable body can act on the movable member of the sensor by a cam effect or by the effect of a direct drive or via a transmission means, such as a cable, chain, etc.

We claim:

1. Device for detecting at least one variable relating to movement of a movable body along a preselected portion of a predetermined linear path, the device comprising a housing mounted adjacent to the preselected portion of the predetermined path, a movement sensor projecting from the housing and adapted to be engaged intermittently by a surface, that is fixed in relation to the movable body, only when the movable body is located within the preselected portion of the path, the movement sensor having a preselected stroke and being capable of converting, while engaged by said surface, the movement of the movable body into a corresponding movement of an influencing member, and detection means providing an output signal that is a function of the movement of the influencing member, wherein the detection means delivers, at least over a predetermined stroke of the influencing member, an electrical signal, the value of which is at least one of a substantially continuous monotonic function of position of the influencing member and a function of speed of the influencing member, and so that the output signal of the detection means is at least one of a substantially continuous monotonic function of position of the movable body, a function of speed of the movable body and a function of acceleration of the movable body.

2. Device according to claim 1, wherein said surface fixed in relation to the moving body comprises an actuating member having a cam profile and fastened to the movable body, such that the movement sensor is contacted by the cam profile of the actuating member whenever the movable body is located in the preselected portion of the path.

3. Device according to claim 2, wherein the actuating member is one of a set of actuating members having different cam profiles, for changing the cam profile in the path of which the movement sensor is located during operation.

4. Device according to claim 2, further comprising means for changing the stroke of the movement sensor.

5. Device according to claim 2, wherein the cam profile is designed to ensure, between the movable body and the sensor, a conversion of movement which compensates the conversion of movement between the sensor and the influencing member in such a way that, over the predetermined stroke, a ratio between speed of the movable body and speed of the influencing member is substantially constant.

6. Device according to claim 1, wherein the sensor acts on the influencing member by means of a cam, the profile of which is designed to ensure that, over the predetermined stroke, a ratio between speed of the movable body and speed of the influencing member is substantially constant.

7. Device according to claim 1, wherein the detection means comprises a means for compensating, in the output signal, the effects of a dependence of a ratio between speed of the movable body and speed of the influencing member on the position of the influencing member.

8. Device according to claim 1, further comprising a switch actuated by at least one of the influencing member and the movement sensor, this switch supplying a second output signal from the device.

9. Device according to claim 8, wherein the predetermined stroke of the influencing member corresponds to a stroke of the sensor extending on either side of a position of rest of the sensor, and wherein the switch is actuated by a tappet actuated by the sensor independently of the influencing member, so that the switch is at rest when the sensor is in the position of rest, and is actuated in the same way if the sensor is shifted from its position of rest in either of two opposite directions.

10. Device according to claim 1 wherein the housing for the detection means is of the type of housing for a limit switch.

11. A method of detecting at least one variable relating to movement of a movable body along a predetermined portion of a linear path, the method comprising the steps of:

positioning a detector assembly adjacent to the predetermined portion of the linear path so that a movement sensor of the detector assembly is contacted and displaced by an actuating surface which is fixed in relation to the moving body when the body moves along said predetermined portion of the linear path;

detecting movement of an influencing member mounted in the detector assembly and displaced by the movement sensor upon displacement thereof by the actuating surface; and providing, responsive to said detecting step, an output signal which is at least one of a substantially continuous monotonic function of position of the movable body, a function of speed of the movable body, and a function of acceleration of the movable body.

12. A method according to claim 11, wherein said body reciprocates on said path within a predetermined stroke of movement, and said actuating surface comprises a cam profile having a length parallel to the path of movement which is less than the stroke of movement of said movable body.

13. A method according to claim 12 wherein the actuating surface comprises a plurality of different actuating surfaces, and the method further comprises adjusting the detector assembly to place the movement sensor so as to be contacted and displaced by a selected one of the actuating surfaces when the moving body is located in the predetermined portion of the path.

14. A method according to claim 11, wherein there is performed a first movement conversion between movement of the actuating surface and movement of the movement sensor and a second compensative movement conversion between movement of the movement sensor and movement of the influencing member thereby to provide, over said predetermined portion of movement, a substantially constant ratio between speed of movement of the movable body and speed of movement of the influencing member.

15. A method according to claim 11, wherein there is performed a movement conversion between movement of the actuating surface and movement of the movement sensor, and the step of providing an output signal comprises compensating in said output signal the effects of a variation of ratio between speed of movement of the movable body and speed of movement of the influencing member as a function of position of the movement sensor.

16. A method according to claim 11, further comprising the step of actuating a switch in response to displacement of the movement sensor.

17. A device for detecting at least one variable relating to movement of a movable body along a preselected portion of a predetermined path, the device comprising:
'a detector assembly including a movement sensor having a preselected stroke and being capable of converting the movement of the movable body into a corresponding movement of an influencing member, and detection means providing an output signal that is a function of the movement of the influencing member, wherein the detection means delivers, at least over a predetermined stroke of the influencing member, an electrical signal, the value of which is at least one of a substantially monotonic function of position of the influencing member and a function of speed of the influencing member, and so that the output signal of the detection means is at least one of a substantially continuous monotonic function of position of the movable body, a function of speed of the movable body, and a function of acceleration of the movable body; and an actuating member having a cam profile and being adapted to be fastened to the movable body independently of the detector assembly, such a that the movement sensor, during operation, is located in the path of movement of the movable body so as to be contacted and displaced by the cam profile of the actuating member.

18. A device according to claim 17 wherein the actuating member is one of a set of actuating members having different cam profiles, for changing the cam profile in the path of which the movement sensor is located during operation.

19. A device according to claim 17, further comprising means for changing the stroke of the movement sensor.

20. A device according to claim 17 wherein the cam profile is designed to perform, between the movable body and the movement sensor, a conversion of movement which compensates a conversion of movement between the sensor and the influencing member in such a way that, over the predetermined stroke of the influencing member, a ratio between speed of movable body and speed of the influencing member is substantially constant.

21. A device according to claim 17 wherein the movement sensor acts on the influencing member by means of a cam, the profile of which is designed to ensure that, over the predetermined stroke of the influencing member, a ratio between speed of the movable body and speed of the influencing member is substantially constant.

22. A device according to claim 17 wherein the detection means comprises a means for compensating in the output signal the effects of a dependence of a ratio between speed of the movable body and speed of the influencing member on the position of the influencing member.

23. A device according to claim 17, further comprising a housing for the detection means of the type of housing for a limit switch.

24. A device for detecting at least one variable relating to movement of a movable body along a predetermined path, the device comprising a movement sensor having preselected stroke and being capable of converting the movement of the movable body into a corresponding movement of an influencing member, and detection means providing a first output signal that is a function of the movement of the influencing member, wherein the detection means delivers, at least over a predetermined stroke of the influencing member, an electrical signal, the value of which is at least one of a substantially continuous monotonic function of position of the influencing member and a function of speed of the influencing member, and so that the output signal of the detection means is at least one of substantially monotonic function of position of the movable body, a function of speed of the movable body, and a function of acceleration of the movable body, and wherein said device further comprises a switch actuated by at least one of the influencing member and the movement sensor, said switch supplying a second output signal from the device.

25. A device according to claim 24 wherein the predetermined stroke of the influencing member corresponds to a stroke of the movement sensor extending on either side of a position of rest of the movement sensor, and wherein the switch is actuated by a tappet actuated by the sensor independently of the influencing member, so that the switch is at rest when the movement sensor is in the position of rest and is actuated in a same way if the sensor is shifted from its position of rest in either of two opposite directions.

26. A device according to claim 24, further comprising a housing for the detection means of the type of housing for a limit switch.

* * * * *

UNITED STATES PATENT AND TRADEMARK OFFICE
CERTIFICATE OF CORRECTION

PATENT NO. : 4,982,106
DATED : January 1, 1991
INVENTOR(S) : CASTELLANET, F. et al.

It is certified that error appears in the above-identified patent and that said Letters Patent is hereby corrected as shown below:

Column 1, Title Page, line [73] Assignee, change:
"La Telemacanique" to --La Telemecanique Electrique--.

Column 2, line 3, change: "analyze" to --analyzes--.

Column 5, line 32, change: "23c,each" to --23c, each--.

Column 7, line 21, change: "embrace" to --embraces--.

Column 9, line 48, change: "'a detector" to --a detector--.

Column 10, line 48, change: "of substantially" to --of a substantially--.

Signed and Sealed this

Twelfth Day of October, 1993

Attest:

BRUCE LEHMAN

Attesting Officer

Commissioner of Patents and Trademarks